United States Patent
Bugdaycioglu et al.

(10) Patent No.: US 12,247,694 B2
(45) Date of Patent: Mar. 11, 2025

(54) TRAJECTORY RECORD ARM

(71) Applicant: EUROBOTIK OTOMASYON VE GORUNTU ISLEME TEKNOLOJILERI SAN. VE TIC. LTD. STI., Istanbul (TR)

(72) Inventors: Evren Bugdaycioglu, Istanbul (TR); Savas Aytek, Kocaeli (TR)

(73) Assignee: EUROBOTIK OTOMASYON VE GORUNTU ISLEME TEKNOLOJILERI SAN. VE TIC. LTD. STI., Istanbul (TR)

( * ) Notice: Subject to any disclaimer, the term of this patent is extended or adjusted under 35 U.S.C. 154(b) by 437 days.

(21) Appl. No.: 17/627,155

(22) PCT Filed: Jul. 9, 2020

(86) PCT No.: PCT/TR2020/050611
§ 371 (c)(1),
(2) Date: Jan. 14, 2022

(87) PCT Pub. No.: WO2021/050019
PCT Pub. Date: Mar. 18, 2021

(65) Prior Publication Data
US 2022/0268398 A1 Aug. 25, 2022

(30) Foreign Application Priority Data
Sep. 11, 2019 (TR) .................. 2019/13754

(51) Int. Cl.
*F16M 11/18* (2006.01)
*F16M 11/28* (2006.01)

(52) U.S. Cl.
CPC ............. *F16M 11/18* (2013.01); *F16M 11/28* (2013.01)

(58) Field of Classification Search
CPC ........... F16M 11/18; F16M 11/28; B25F 3/00; H04N 23/555
(Continued)

(56) References Cited

U.S. PATENT DOCUMENTS 5,913,495 A * 6/1999 Maciel Thom ........... B25B 9/00
81/177.2
6,369,849 B1 * 4/2002 Rzyski ................... H04N 23/58
348/82
(Continued)

FOREIGN PATENT DOCUMENTS

| AU | 2019100816 A4 | 8/2019 |
| JP | 2015039750 A | 3/2015 |
| WO | 2015161721 A1 | 10/2015 |

*Primary Examiner* — Eret C McNichols
*Assistant Examiner* — Michael McDuffie
(74) *Attorney, Agent, or Firm* — Bayramoglu Law Offices LLC

(57) ABSTRACT

A trajectory record arm is disclosed, on which the connection apparatus is engaged in order to provide the transmission of the motion trajectory of a connection apparatus to a trajectory recording device. The trajectory record arm includes: at least one telescopic bar which is engaged on one side with at least one fastening element and on the other side with the connection apparatus such that freedom of rotation is allowed between the fastening element and the connection apparatus, at least one first sensor for detecting the movement between the telescopic bar and the fastening element, at least one second sensor for detecting the distance change between the fastening element and the connection apparatus based on the change in the length of the telescopic bar, at least one third sensor for detecting the movement of the connection apparatus in relation with the telescopic bar.

4 Claims, 1 Drawing Sheet

(58) Field of Classification Search
USPC .......................................... 248/415; 348/82
See application file for complete search history.

(56) References Cited

U.S. PATENT DOCUMENTS

| | | | | |
|---|---|---|---|---|
| 8,494,725 | B2* | 7/2013 | Zurfluh | H01Q 1/34 |
| | | | | 248/157 |
| 10,105,837 | B2* | 10/2018 | Troy | B23Q 17/2233 |
| 10,415,742 | B2* | 9/2019 | Kundu | F16M 11/041 |
| 11,209,121 | B2* | 12/2021 | Kerestes | G05G 15/007 |
| 2007/0109403 | A1* | 5/2007 | Lortie | E03F 7/12 |
| | | | | 348/E7.087 |
| 2015/0144762 | A1* | 5/2015 | Lam | G01L 5/00 |
| | | | | 248/542 |
| 2016/0123521 | A1* | 5/2016 | Raabe | B66C 13/12 |
| | | | | 248/298.1 |
| 2017/0219814 | A1* | 8/2017 | Letter | G01M 15/14 |
| 2017/0366746 | A1* | 12/2017 | Yu | G10L 15/25 |
| 2018/0106418 | A1* | 4/2018 | Anglin | H04N 23/695 |
| 2021/0387347 | A1* | 12/2021 | Koci | F16M 11/10 |

* cited by examiner

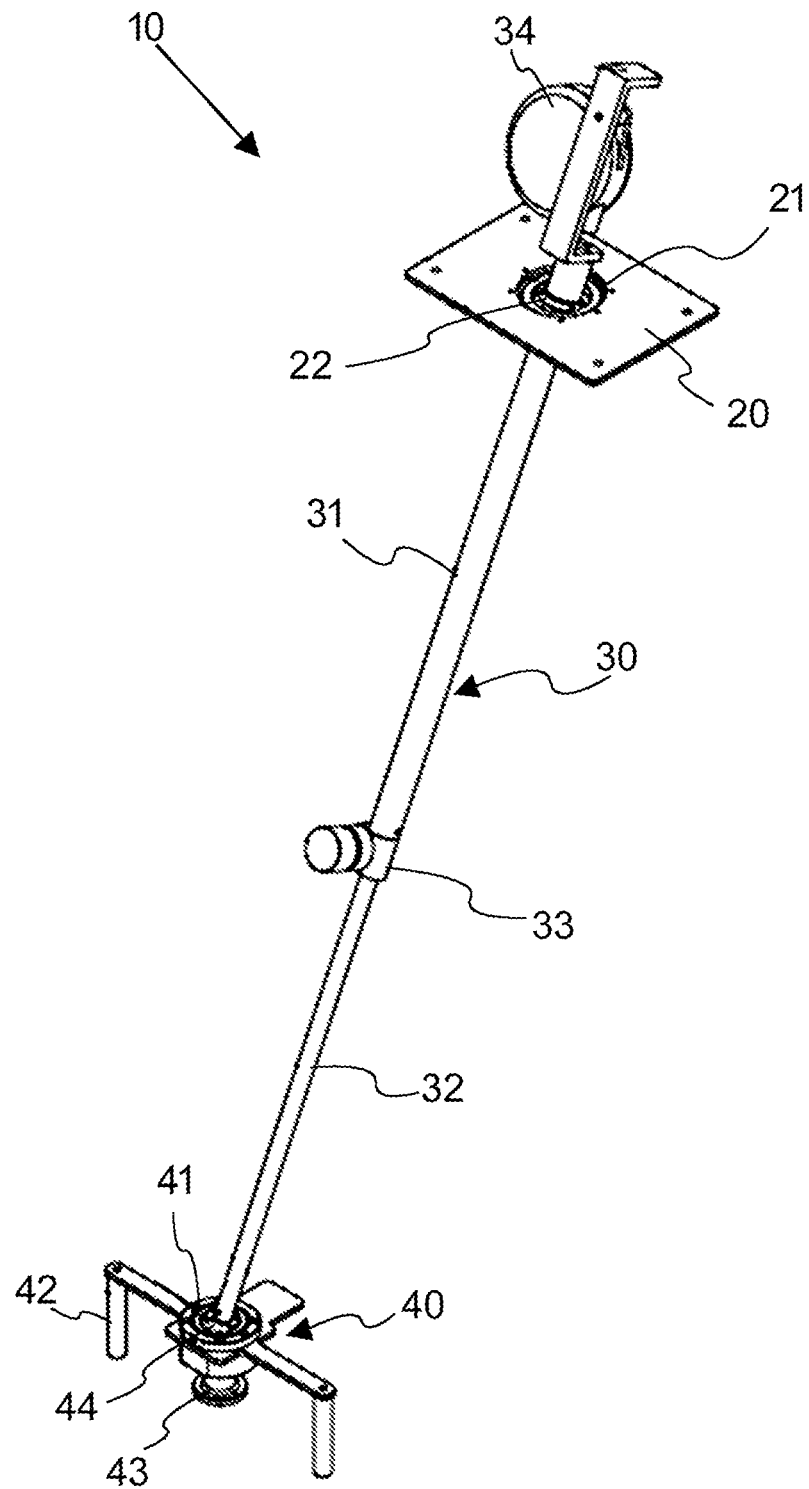

TRAJECTORY RECORD ARM

CROSS REFERENCE TO THE RELATED APPLICATIONS

This application is the national phase entry of International Application No. PCT/TR2020/050611, filed on Jul. 9, 2020, which is based upon and claims priority to Turkish Patent Application No. 2019/13754, filed on Sep. 11, 2019, the entire contents of which are incorporated herein by reference.

TECHNICAL FIELD

The invention relates to a trajectory record arm on which the connection apparatus is engaged in order to provide the transmission of the motion trajectory of a connection apparatus to a trajectory recording device.

BACKGROUND

Information technologies influence our daily lives more day by day and the fields of use thereof expand. The requirements in many fields such as education, health, transportation, and entertainment have started to be fulfilled with the software technologies. The three-dimensional (3D) simulation of the physical environment and conditions of the same has become widespread rapidly. The 3D simulation of the real environments and applications for the sake of training, production, analysis or testing in virtual environment is seen in many researches since it facilitates the applications in real life.

Data are received by means of sensors (for example, position determination devices) or image processing method through the cameras positioned at predetermined points in the current applications. However, the measurement values are influenced by the interferences and fluctuations due to the factors such as light, dust, color distribution in the environment, and UV rays in the environment, leading to results with lower accuracy ratio. This also reduces the rate of accuracy of the transmitted data.

Another technology is a system built on a sensor which is located on a fixed place and a transmitter moved by the user. This system is influenced by any kind of factors such as magnetic field, electric motors, and electrical field which can distort the signaling in the environment and thus the accuracy ratio of the transmitted data is reduced.

In another method pattern previously used, the measurements are taken via a camera which results in incorrect data since the material is influenced by the particles during spraying process. For this reason, coordinate measurements cannot be made during material spraying in these methods, measurement was taken with the empty movements of the guns.

Another method used is to record the measurements by the operator via carrying this trajectory record arm after the motor brakes on the manipulator fade performing the application. The most important disadvantage of this method is that the operator may have the risk of crushing or compressing in case that electronic or mechanical fault occurs together with entering under the manipulator.

As a result, all abovementioned problems have made it necessary to make an improvement in the relevant technical field.

SUMMARY

The present invention is related to a trajectory record arm, in order to eliminate the abovementioned disadvantages and to bring new advantages to the relevant technical field.

An object of the invention is to provide a trajectory record arm which facilitates the recording of a motion trajectory.

The invention is a trajectory record arm on which the connection apparatus is engaged in order to provide the transmission of the motion trajectory of a connection apparatus to a trajectory recording device. Accordingly, its novelty lies in that it comprises the following: at least one telescopic bar which is engaged on one side with at least one fastening element and on the other side with said connection apparatus such that they have freedom of rotation between them, at least one first sensor for detecting the movement between said telescopic bar and said fastening element, at least one second sensor for detecting the distance change between the fastening element and the connection apparatus based on the change in the length of the telescopic bar, at least one third sensor for detecting the movement of the connection apparatus in relation with the telescopic bar. Therefore, the data of the motion trajectory performed by the trajectory record arm in space is transmitted to the trajectory recording device and the motion is allowed to be recorded and repeated.

A preferred embodiment of the invention is characterized in that the telescopic bar comprises at least one first bar and at least one second bar which are telescopic and said second sensor is configured such that it detects the interlocking distance of said first bar and second bar. Thus, the elongation and shortening of the telescopic bar is enabled as well as the movement based on its elongation and shortening is detected.

A preferred embodiment of the invention is characterized in that the telescopic bar is engaged with at least one balancing element in order to move the connection apparatus in an ergonomic manner. Therefore, the ergonomic use of the connection apparatus is provided by means of eliminating excessive force while it is being moved by the operator.

A preferred embodiment of the invention is characterized in that it comprises at least one handle in order to move the connection apparatus in the desired trajectory. Therefore, the operator guides the connection apparatus properly by holding the same easily.

BRIEF DESCRIPTION OF DRAWINGS

An illustrative perspective view of the inventive trajectory record arm is given in the FIGURE.

REFERENCE NUMBERS

10 Trajectory record arm
20 Fastening element
21 First slot
22 First sensor
30 Telescopic stick
31 First bar
32 Second bar
33 Second sensor
34 Balancing element
40 Connection apparatus
41 Second slot
42 Handle
43 Connection section
44 Third sensor

DETAILED DESCRIPTION OF THE EMBODIMENTS

In this detailed description, the subject of the invention is described by means of examples only for clarifying the subject matter such that no limiting effect is created.

An illustrative perspective view of the inventive trajectory record arm (10) is given in the FIGURE. Accordingly, said trajectory record arm (10) provides the transmission of the motion trajectory or at least one connection apparatus (40) to at least one trajectory recording device (not shown in the FIGURE). The inventive trajectory record arm (10) provides defining motion trajectory to aforementioned trajectory recording device for the applications in the mechanical processes depending on the hand movement of the master of the fields such as painting, glazing, denim sandblasting, welding.

The trajectory record arm (10) has at least one fastening element (20), at least one telescopic bar (30) and at least one connection apparatus (40) in order to perform the motion required to be recorded. Said fastening element (20) enables the trajectory record arm (10) to be positioned on a predetermined location. Said telescopic bar (30) has at least one first bar (31) and at least one second bar (32) in a preferred embodiment of the invention. Said first bar (31) and said second bar (32) provides the telescopic bar (30) to be extended and shortened by means of intertwining to each other. The telescopic bar (30) is engaged with the fastening element (20) by passing through at least one first slot (21) such that they have a freedom of rotation between them. While the telescopic bar (30) is engaged with a fastening element (20) on one side, it is engaged with said connection apparatus (40) on the other side. At least one second slot (41) is used in engaging the telescopic bar (30) and the connection apparatus (40). The connection apparatus (40) is provided to be engaged with the telescopic bar (30) by means of said second slot (41) such that there is freedom of rotation between them.

The connection apparatus (40) has at least one handle (42) and at least one connection part (43). Said connection part (43) enables to carry the equipment required for the process (painting, denim sandblasting, glazing, disinfection etc.) to be made by means of the trajectory record arm (10). Said handle (42) provides the orientation of the connection apparatus (40) by the operator. Moreover, at least one balancing element (34) is engaged with the telescopic bar (30). Said balancing element (34) provides ease of use by means of reducing the force in the opposite direction occurred in the telescopic bar (30) during the movement of the connection apparatus (40) by the operator.

The trajectory record arm (10) has at least one first sensor (22), at least one second sensor (33) and at least one third sensor (44) for determining the motion it performs. Said first sensor (22) is configured such that it detects the movement of the telescopic bar (30) in relation with the fastening element (20). Said third sensor (44) is configured such that it detects the movement of the connection apparatus (40) according to the telescopic bar (30). Said second sensor (33) detects the modifications of the length of the telescopic bar (30) based on the movement of the first bar (31) and the second bar (32). The preferred embodiments of the invention can be first sensor (22), second sensor (33) and third sensor (44), at least one tilt sensor, distance sensor or an encoder.

Therefore, the trajectory record arm (10) movement made by the operator is detected and transmitted to the trajectory recording device.

The trajectory recording device enables the process to be realized and thus it can transmit these data to the external units depending on the movement data achieved by the trajectory record arm (10). The trajectory record can be created easily for any application area together with this configuration. Although creating the trajectory record easily threatens the health of the master, it provides simplicity for the conditions where it is difficult to work without a master.

The protection scope of the invention is specified in the appended claims and cannot be limited to the description made for illustrative purposes in this detailed description. Likewise, it is clear that a person skilled in the art can present similar embodiments in the light of the above descriptions without departing from the main theme of the invention.

What is claimed is:

1. A trajectory record arm, wherein a connection apparatus is engaged on the trajectory arm in order to provide a transmission of a motion trajectory of the connection apparatus to a trajectory recording device, and the trajectory record arm comprises: at least one telescopic bar, wherein the at least one telescopic bar is engaged on a first side with at least one fastening element through at least one first slot and on a second side with the connection apparatus using at least one second slot that allows for freedom of rotation between the at least one telescopic bar and the connection apparatus, so that a freedom of rotation is allowed between the at least one fastening element and the connection apparatus,
   at least one first sensor for detecting a movement between the at least one telescopic bar and the at least one fastening element,
   at least one second sensor for detecting a distance change between the at least one fastening element and the connection apparatus based on a change in a length of the at least one telescopic bar,
   at least one third sensor for detecting a movement of the connection apparatus in relation with the at least one telescopic bar.

2. The trajectory record arm according to claim 1, wherein the at least one telescopic bar comprises at least one first bar and at least one second bar, wherein the at least one first bar and the at least one second bar are intertwining, and the at least one second sensor is configured to detect an interlocking distance of the at least one first bar and the at least one second bar.

3. The trajectory record arm according to claim 1, wherein the connection apparatus is engaged with at least one balancing element on the first side of the at least one telescopic bar so as to move the connection apparatus in an ergonomic manner.

4. The trajectory record arm according to claim 1, further comprising at least one handle so as to move the connection apparatus in a desired trajectory.

* * * * *